July 16, 1968  A. J. HARTNER ET AL  3,393,098
FUEL CELL COMPRISING A HYDROGEN DIFFUSION ANODE HAVING TWO
LAYERS OF DISSIMILAR METALS AND METHOD OF OPERATING SAME
Filed March 24, 1964
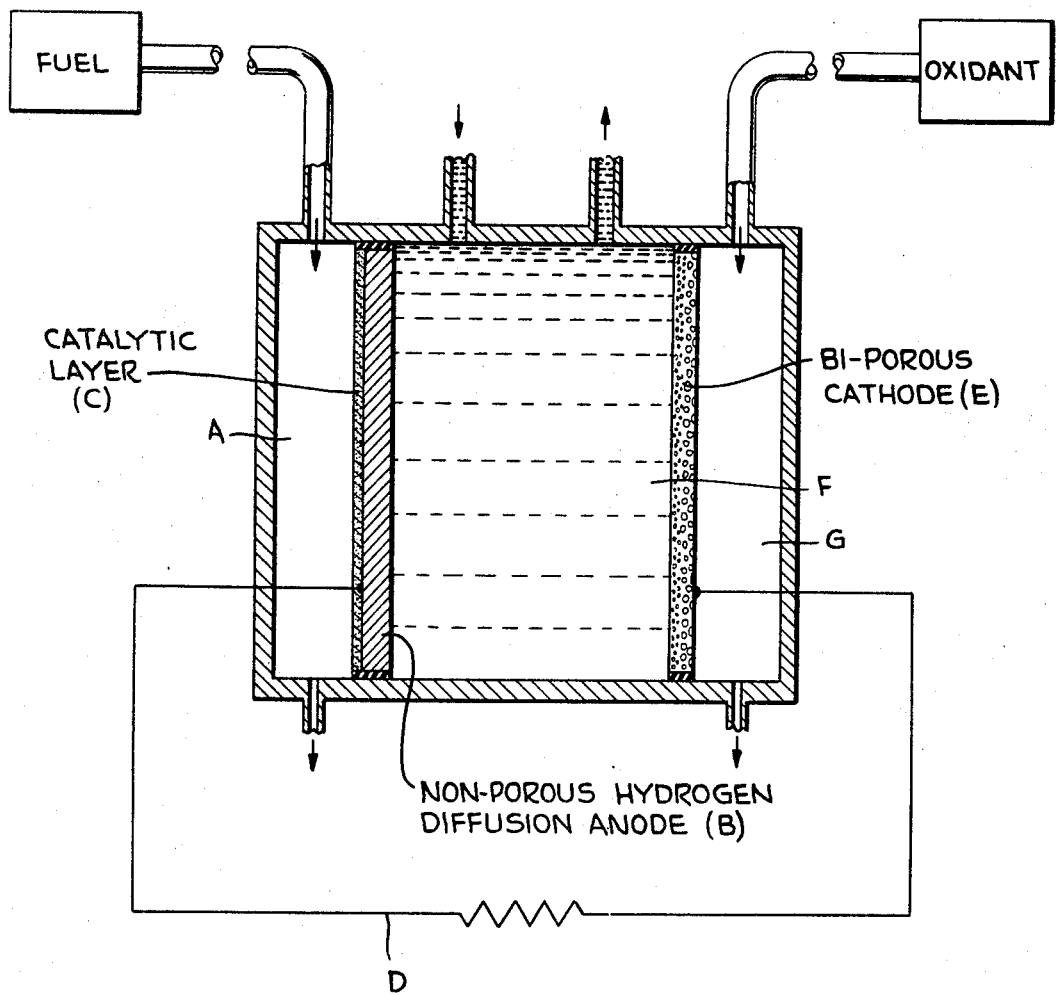
INVENTORS,
ANTAL J. HARTNER
MICHAEL A. VERTES
BY Watson, Cole, Grindle & Watson
ATTORNEYS 3,393,098
FUEL CELL COMPRISING A HYDROGEN DIFFUSION ANODE HAVING TWO LAYERS OF DISSIMILAR METALS AND METHOD OF OPERATING SAME
Antal J. Hartner and Michael A. Vertes, New York, N.Y., assignors to Leesona Corporation, Warwick, R.I., a corporation of Massachusetts
Continuation-in-part of application Ser. No. 276,867, Apr. 30, 1963. This application Mar. 24, 1964, Ser. No. 355,996
8 Claims. (Cl. 136—86)

This application is a continuation in part of copending application Ser. No. 276,867, filed Apr. 30, 1963, now abandoned.

This invention relates to an improved fuel cell unit, and more particularly, to a hydrogen generating fuel cell unit comprising a hydrogen diffusion palladium alloy anode in intimate contact with a catalyst. The fuel cell unit permits the in situ formation of hydrogen fuel from a hydrogen containing material.

A fuel cell, as the term is employed in the present specification, embraces a device for the conversion of the energy of a chemical reaction between a fuel and oxidant directly into low voltage, direct current electricity. In constructing an efficient fuel cell, the basic problem encountered is essentially one of chemical kinetics. For efficient operation of the cell, the amount of energy degraded into wasted or unwanted heat must be as small as possible, but on the other hand, the reaction rate of the cell must be sufficiently high to economically produce the necessary current output from a cell of practical size.

A typical cell comprises a fuel electrode, an oxidizing electrode, an electrolyte positioned between the electrodes and means for the introduction of fuel and oxidant to the respective electrodes. In the operation of a cell employing an alkaline electrolyte, oxidant is passed through the cathode or oxidizing electrode where the oxidant reacts with the electrolyte within the pores of the cathode. Hydroxyl ions are formed, which pass through the pores of the electrode into the electrolyte for transference to the anode. At the anode of the cell, fuel enters and impinges on the electrode, where a process of electrochemical oxidation occurs. The fuel molecules dissociate with the positive part of the molecule forming a reaction product with the oxidant and leaving the electrode negatively charged. When employing an acid electrolyte system, substantially the same mechanism occurs, however, the fuel molecules are dissociated with the positive part of the molecule migrating to the cathode for reaction with the negative moiety of the oxidant, forming a neutral product. The electrical charges in both systems are drawn off from the electrode through an external circuit.

Since fuel cells, unlike most sources of energy, are not governed by the Carnot cycle limitation on the maximum conversion of heat to electricity, the only limits of conversion efficiency in the cell are regulated by the free energy change in the cell reaction and the degree of irreversibility of the cell in operation. Therefore, fuel cells are particularly attractive commercially, and cells have been constructed demonstrating efficiencies of up to about 90%, which is far superior to the efficiency of a gas turbine, which has a maximum efficiency of only about 30%, due to Carnot's heat law. Furthermore, due to the simplicity of the cells' construction, they have excellent potential as a source of power in the less developed or remote areas of the world.

In an effort to obtain a fuel cell which is practical on a commercial scale, a substantial amount of research has been carried out to obtain improved electrodes, with emphasis being placed on electrodes which will operate efficiently on low cost and commercially available fuels. Ideally, an electrode should permit accurate control of the reaction interface, i.e., the interface where electrode surface, fuel gas and electrolyte converge and react; have high activity with commercially available fuels, and be relatively light in construction and inexpensive in manufacture. In the early fuel cells, the electrodes employed were substantially homoporous. Therefore, to regulate the interface of solid electrode, reactant gas and electrolyte, it was necessary to control the pore size of the electrode during the manufacture of the electrode and, while operating the cell, to accurately control the pressure differential of the gas and surface tension of the electrolyte. As a practical matter, it was substantially impossible to obtain pores completely uniform in size; thus, the cell was always operated with the smaller pores of the electrode flooded with electrolyte, due to capillary action, or with gas bubbling through the larger pores unconsumed.

As a solution to the above problem, Francis T. Bacon introduced a biporous electrode structure, where in use in a fuel cell, large pores of the structure face the gas supply and smaller pores face the electrolyte. The three-phase interface of gas, electrode, and electrolyte occurs substantially at the biporous wall. Although biporous electrodes minimize the problem of controlling the reaction interface, the structures are relatively expensive, requiring the use of carefully fractionated metal powders having well-defined grain size and a multi-step operation for their production. Moreover, in a hydrogen-oxygen system, the oxidation of hydrogen at the three-phase interface results in the formation of water within the pore structure, presenting a serious problem. Furthermore, such electrodes require the use of substantially pure hydrogen, since impurities in the gas will block the porous openings, preventing or reducing the rate of diffusion of hydrogen to the reaction interface.

More recently, electrodes have been suggested, fabricated from non-porous palladium alloy membranes. Such electrodes are light in weight, permit the diffusion of hydrogen, but prevent the passage of inert gaseous impurities into the electrolyte and allow water formation only on the electrolyte side of the membrane. These electrodes, therefore, have solved to a substantial extent, the problems encountered with the more conventional homoporous and biporous structures. As apparent, however, the aforesaid nonporous palladium alloy electrodes can only be operated on hydrogen fuel. Hydrogen, even in the impure state, is relatively expensive and poses problems in regard to storage. Thus, since hydrogen is a gas at ambient temperatures, it is necessary to maintain the fuel under pressure or in cryogenic tanks. This feature greatly restricts the use of hydrogen fuel, particularly for mobile units. Therefore, it is highly desirable to obtain a fuel cell electrode which will operate on low cost liquid fuels, such as methanol or ethanol, but which will provide the same high electrochemical performance of a cell operating on hydrogen.

It has been suggested that a fuel cell be operated in conjunction with an external hydrogen generator, i.e., where carbonaceous fuels are cracked or reformed by heat, preferably in the presence of a catalyst, producing hydrogen and by-products. The hydrogen obtained is thereafter circulated to the fuel electrode of the fuel cell for consumption. While such systems are advantageous, much ancillary equipment is required, taking up substantial amounts of space. Moreover, such units are operated at high temperatures, due to equilibrium restrictions, consuming considerable quantities of heat energy for the break-down of the carbonaceous fuels. The heat energy required materially cuts down on any cost advantage gained. Therefore, while such systems are possibly feasible where there is no shortage of space, they are not adapted for use in mobile systems or where space is limited.

Accordingly, it is an object of the present invention to provide a compact fuel cell unit which will operate on a hydrogen generating fuel, but possesses the same electrochemical activity as a cell employing pure hydrogen.

It is another object of the invention to provide a compact fuel cell unit which consumes substantially all waste heat resulting from the fuel cell reaction.

It is another object of the invention to provide a compact fuel cell unit which will sustain high current densities for prolonged periods of time at relatively low operating temperatures employing hydrogen generating fuels.

It is another object of the invention to provide a compact fuel cell unit employing a non-porous hydrogen diffusion anode containing an in situ hydrogen generator.

It is another object of the invention to provide a fuel cell unit operating on a hydrogen containing fuel, whereby the hydrogen producing reaction is unbalanced by consumption of the hydrogen as it is produced.

These and other objects of the invention will become more fully apparent from the following detailed description with particular emphasis being placed on the illustrative examples and drawing.

According to the instant invention, a reform and/or shift catalyst is placed in intimate contact with, or immediately adjacent a non-porous hydrogen diffusion anode, such as a palladium alloy membrance. The catalytic material can be substantially any reform or shift catalyst. A hydrogen producing fuel, such as methanol, ethanol or carbon monoxide, is fed to the anode, preferably in the presence of water, where the fuel undergoes a reform and/or shift reaction producing hydrogen gas and by-products. The hydrogen gas is immediately extracted from the reaction site, through the non-porous hydrogen diffusion membrane. Since the hydrogen gas is extracted from the reform and/or shift reaction site as soon as it is formed, the equilibrium of the reforming and/or shift reaction is unbalanced, favoring the formation of more hydrogen. Thus, in essence, the non-porous membrane simultaneously acts as the fuel cell anode and as a hydrogen extractor. Moreover, heat from the fuel cell reaction is utilized in the reforming and/or shift process.

More specifically, referring to the drawing which is a diagrammatic illustration of a fuel cell according to the instant invention, a hydrogen generating fuel is passed from a suitable storage unit into compartment A behind a non-porous hydrogen diffusion membrane B in intimate contact with or adjacent a catalytic material C. During the reaction at the catalytic layer, employing a methane-steam mixture as fuel for purposes of illustration, hydrogen is produced according to the equation:

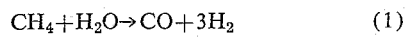

$$CH_4 + H_2O \rightarrow CO + 3H_2 \quad (1)$$

followed by shift reaction:

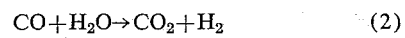

$$CO + H_2O \rightarrow CO_2 + H_2 \quad (2)$$

The hydrogen gas is removed from the reaction site, passing through hydrogen diffusion membrane B where a process of chemisorption occurs removing an electron from the hydrogen molecule which is transported through an external circuit D to the cathode E. The hydrogen proton is passed into the electrolyte F. Oxidant is passed into oxidizing compartment G and is absorbed by cathode E. In the case of an alkaline electrolyte, hydroxyl ions are transferred to the anode through the electrolyte where they combine to form molecules of water.

Since the catalytic layer is in intimate contact with, or adjacent to the non-porous membrane and hydrogen is extracted as it is formed, the reform and shift reaction occur simultaneously, permitting a 100% conversion of the hydrocarbon. On the other hand, in the conventional hydrogen generator system, the equilibrium performance of the reactions of Equations 1 and 2 are temperature dependent. For example, at 600° F., reactor temperature, the reform conversion would be very low, employing the known conversion catalysts. High conversion can be obtained only at relatively high temperatures. At high temperatures, however, the hydrogen content of the equilibrium gas mixture for the shift conversion is relatively low. Therefore, the temperature must be lowered to obtain high shift conversions. Moreover, a selective catalyst must be used during the shift process, or the reform reaction (1) would reverse and methane be reformed at the lower temperature.

Therefore, in the present fuel cell, the in situ reform and/or shift process is decidedly superior to the commonly employed procedure of converting a hydrogen generating fuel to hydrogen where equilibrium restrictions require a high temperature to convert the fuel to hydrogen and carbon monoxide, and lower temperatures to shift the carbon monoxide to carbon dioxide. By removing hydrogen from the reaction site as soon as it is formed, it is possible, as noted hereinbefore, to obtain a 100% hydrogen conversion at substantially any temperature, including ambient temperatures. In the actual practice of the present invention, however, the reform or shift reaction will be carried out at the operating temperature of the cell. By having the reform unit in intimate contact or adjacent the non-porous hydrogen diffusion membrane, once the cell unit is brought to reaction temperature, the heat generated by the fuel cell will be used, as noted hereinbefore, to supply the heat needed for the reform operation. Thus, there is a high degree of co-action between the catalytic layer and the fuel cell anode.

In fuel cells according to the present invention, since only hydrogen is diffused through the non-porous hydrogen diffusion membrane, impurities of the reform and/or shift reaction, such as carbon dioxide, are conveniently removed from the cell by suitable venting. The impurities, being concentrated on the fuel gas side of the non-porous membrane, cannot contaminate the electrolyte. Moreover, since water is only formed on the electrolyte side of the membrane, flooding of the electrode is impossible.

In the presently described fuel cell unit, the nonporous hydrogen diffusion membrane can be composed of any substance which will diffuse hydrogen at a sufficient rate, preferably at temperatures of from 75–350° C., and which has high electrochemical performance characteristics. The metals of Groups V and VIII of the Mendelyeev Periodic Table, such as palladium, columbium, and tantalum and alloys thereof, have been found to be particularly advantageous. However, silver and gold alloys of palladium are exceptional as a practical matter, and therefore preferred, due to their availability, superior hydrogen diffusion properties, ability to withstand the environment of an operating fuel cell, and high electrochemical performance activity. The palladium alloy membranes for use herein contain from about 5–40% gold or silver, on a weight basis, with the remainder ordinarily being palladium. However, it may be advantageous for certain applications, i.e., where it is necessary to have increased structural strength, etc., to employ a third element, such as copper, platinum or tellurium in the alloy membrane. The amount of the additional metal will ordinarily not exceed more than about 5% of the total weight. Membranes having less than about 5% gold or silver do not possess the necessary structural strength after prolonged use in a fuel cell or the high electrochemical activity for practical application. On the other hand, membranes having more than about 40% gold or silver will not diffuse sufficient hydrogen for an efficient fuel cell.

The thickness of the non-porous membrane for use as the fuel cell anode and hydrogen extractor depends to a large extent upon the pressure differential to be applied across the membrane and upon the rapidity of the diffusion desired. Diffusion of hydrogen gas through the membrane is directly proportional to the pressure differential across the membrane and inversely proportional to the membrane's thickness. The minimum thickness is immaterial as long as the membrane is completely nonporous and is structurally able to withstand the necessary pressure of the cell. The preferred range of thickness is from about 0.5–30 mils. The membranes can be fabricated as flat support sheets or as corrugated or tubular constructions. The gold and silver alloy membranes of palladium preferably employed herein, are highly ductile and permit convenient handling and processing employing the conventional metal working techniques. These alloy membranes are exceptionally resistant to corrosive environments, including strong alkalies and strong acids at low potentials, i.e., when used as anodes.

The non-porous membranes are prepared by any of several techniques known in the art. Thus, the palladium and gold or palladium and silver alloy membranes can be admixed in the desired ratios, heated to the molten condition and cast, followed by rolling and drawing techniques. Additionally, the palladium alloy membrances can be cast onto porous metal supports or grids, by chemical or electrical deposition. These procedures are known in the art and form no part of the instant invention.

Although it is not completely essential, in order to obtain superior electrochemical performance characteristics, it is desirable to apply an activating layer to the surface of the non-porous membrane and, preferably, a thin film of black. Plating blacks found particularly operative include palladium, platinum, rhodium, ruthenium, a mixture of platinum and rhodium or platinum and iridium. Depending upon the environment of the fuel cell, and particularly the electrolyte employed in the cell, it may be advantageous to apply different blacks to the different surfaces of the membrane. Thus, a palladium black coating on the surface of the membrane fronting the gaseous feed provides excellent results. However, particularly when an acid electrolyte is employed, it may be desirable to apply a coating of platinum black which is highly resistant to an acid environment to the electrolyte side of the membrane. The performance characteristics of the fuel cell system employing the palladium alloy electrodes which have been activated with a thin layer of black are surprisingly superior in comparison with electrodes which have not been activated. The blacks employed are obtained by known prior art means, as for example, by electrolytically depositing the metal from a solution thereof, such as palladium from a solution of palladium chloride.

The coating of the non-porous palladium alloy membranes with the black is performed by methods known in the art, for example, by electrodeposition from an aqueous acid solution. Additionally, it has been found that surprisingly superior results are achieved, particularly in regard to film adherence, by pre-exposing the electrode structure to be plated to hydrogen before plating with a black. The exposure to hydrogen can be accomplished by passing hydrogen at a positive pressure into the membrane at a high temperature. Other techniques include cathodic treatment in dilute sulphuric acid or dilute potassium hydroxide. After exposure of the membrane to hydrogen, the membrane can be plated by simply immersing in a solution of the plating metal, for example, a 2% solution of palladium chloride. The hydrogen functions as a reducing agent, affecting the deposition of the black.

The quantity of the black applied is not particularly critical. Improved fuel cell performance is noted with the deposition of from 0.5–50 milligrams of black per sq. cm. of electrode surface with the usual amount being no more than about 1–15 milligrams of black per sq. cm. of surface due to economic considerations. From a practical standpoint, any amount of black can be applied by the above methods, however, it may be necessary to subject the structure to be plated to re-cathodic treatment. Furthermore, depending upon the ultimate environment in which the activated non-porous palladium alloy membranes are employed, it may be desirable to coat one surface with one thickness of palladium and a second surface with a different thickness, or the second surface can be coated with another black, such as platinum. The coating of the separate surfaces with different blacks or with different thicknesses of the same black can be accomplished by exposing the first surface to the plating solution while masking the second surface and thereafter, coating the second surface. Depending upon the techniques employed, modifications in the structures are obtainable. Additionally, other means of activating the palladium alloy membrane surfaces can be carried out.

The catalysts maintained in intimate contact or adjacent to the non-porous hydrogen diffusion membrane include known reforming and/or shift catalysts. Depending upon the hydrogen generating fuel employed and the operating temperature of the fuel cell unit, one particular catalyst may be more advantageous than another. In general, however, elemental materials, their oxides and mixtures thereof are operable. Mixtures of zinc, copper and chromium with minor traces of iron are highly effective. Other catalysts, such as nickel, cobalt, iron, ruthenium, thorium, either in the elemental state or as oxides, either individually or in combination, can be used. The catalyst, as noted hereinbefore, is maintained in intimate contact or closely adjacent to the non-porous membrane. If the catalyst is spaced a substantial distance from the non-porous membrane, the diffusion of hydrogen and the heat transfer between the catalyst layer and the membrane will be decreased. If this is the case, the equilibrium conditions favoring the production of additional hydrogen will also be decreased. Therefore, the catalyst is preferably maintained in intimate contact with the membrane, either in the powered state or applied to the non-porous membrane as a relatively thin coating. Thus, a powdered catalyst can be maintained in intimate contact with the non-porous membrane in the dry state employing a suitable support grid or screen, or the catalyst can be made up into a paste-like mixture and applied to the membrane. Although the thickness of the catalytic layer is not critical, noramlly the layer will be from about 2–100 mils thick when maintained adjacent to, or in contact with, a membrane having a thickness of from 0.5–10 mils. As is apparent, the thinner the layer, the more efficient will be the hydrogen extraction and transference of heat generated by the fuel cell reaction to the reform and/or shift reaction site.

The presently described fuel cell units are operable within a fairly wide temperature range. Thus, since hydrogen is being extracted from the reform or cracking site as it is formed, the reaction will occur at any temperature including ambient temperatures. However, for good hydrogen diffusion and for efficient operation of the reform unit, it is desirable that the temperature of the system be in excess of about 25° C. and, preferably not over about 400° C. The optimum temperature range is in the neighborhood of about 75–275° C. A particularly desirable feature, as noted hereinbefore, is the removal of the waste heat of the fuel cell by the reform or shift reaction, solving a particularly troublesome problem encountered in the construction of an efficient fuel cell.

The present cells can be operated with a variety of electrolytes, including aqueous alkalies, such as potassium hydroxide, sodium hydroxide, potassium carbonate and the alkanol amines. Acid electrolytes which may be employed include sulphuric and phosphoric acid. If an acid electrolyte is selected, it is advantageous to coat the surface fronting the electrolyte with an acid resistant metal black, such as platinum, to avoid attack of the non-porous membrane by the acid. An outstanding feature of the anode of the instant invention, as noted hereinbefore, is that the formation of reaction by-products occurs only on the electrolyte side of the membrane and, therefore, cannot flood or block the electrode structure. The by-products can be removed from the electrolyte by suitable means. Thus, substantially any electrolyte can be employed as long as it is capable of transferring ions and remains substantially invariant in the operating environment of the fuel cell.

Fuel cells employing the present non-porous hydrogen diffusion membranes in intimate contact with a catalytic layer providing an in situ hydrogen producing unit can be operated with substantially any of the prior art cathodes. Thus, homoporous and biporous structures including those described by Francis T. Bacon in U.S. Patent No. 2,716,670, which are nickel electrodes having a surface coating of lithiated nickel oxide and the cobalt nickel activated biporous nickel electrodes, described more fully in the Lieb et al. co-pending application, Ser. No. 165,212, now abandoned, are patricularly suitable. Other cathodes include carbon substrate or silver activated carbon substrate electrodes, as well as silver or silver alloy electrodes. The proper selection of a suitable electrode depends upon such factors as the oxidant employed and the materials which are commercially available. As is apparent, the fuel cell can be operated with any oxidant, such as oxygen or air.

The fuels which can be used in the present fuel cell unit are those which will break down under suitable conditions to provide hydrogen, including the lower molecular weight hydrocarbons, such as methane, ethane, propane, butane, pentane, hexane and heptane as well as lower molecular weight alcohols, such as methanol, ethanol, propanol, isobutanol, and pentanol. Additionally, carbon monoxide can be employed. Moreover, in addition to carbonaceous fuels, it is possible to decompose other hydrogen containing materials such as ammonia to provide hydrogen for consumption at the fuel cell anode, according to the instant invention. As noted hereinbefore, a select catalyst may be more advantageous for a designated fuel than another. However, having the instant specification as a guide and with the knowledge that an operable unit can be obtained, the proper selection and pairing of catalyst and fuel is within the ability of one skilled in the art.

Having described the invention in general terms, the following examples are set forth to more particularly illustrate the invention. However, they are not to be construed as limiting. Other embodiments can be conveniently employed without departing from the scope of the instant invention.

*Example 1*

A 75% palladium-25% silver alloy non-porous membrane having a thickness of 0.0015 inch was activated with palladium-black as follows: The membrane is cleaned by air abrading with finely powdered aluminum oxide. Thereafter, the membrane is suspended in a 5% aqueous potassium hydroxide bath. Platinum anodes are inserted in the potassium hydroxide bath on each side of the non-porous palladium-silver alloy membrane. Two anodes are employed to prevent curling of the membrane being plated. Current is applied from a battery source. The electrode is kept in the aqueous potassium hydroxide bath for eight minutes, at which time a curtain of bubbles appears on the face of the electrode. The time of the treatment is not critical, it only being necessary to obtain a complete, or substantially complete, curtain of bubbles on the surface to be plated. The palladium-silver membrane is removed from the electrolyte bath and rinsed with distilled water. The membrane is then immersed in a 2% $PdCl_2$ bath. The membrane is kept in the bath for eight minutes, depositing a film of palladium-black on the membrane. Approximately four milligrams of palladium are deposited per sq. cm. of membrane surface. The electrode structure is washed with distilled water to remove excess palladium-chloride solution. Both sides of the membrane are coated. The operation is carried out at room temperature.

After the palladium alloy membrane is activated with palladium-black, a cracking and water shift reaction catalyst is applied to the gas side of the electrode. The catalyst consists of finely divided copper and was prepared by precipitation from a 15% by weight aqueous copper sulphate solution with metallic zinc. The thickness of the catalyst layer is $\frac{1}{32}$ of an inch.

The above described structure is employed as the anode in a fuel cell in conjunction with a biporous nickel cathode activated with cobalt-nickel oxide. The cathode activation is carried out by impregnating the structure with a solution of cobalt and nickel nitrates, employing a 7 to 3 cobalt to nickel ratio, containing 10% by weight metal, drying and oxidizing the structure at 500° C. in air. The preparation of such cathodes is described more completely in the Lieb et al. co-pending application, Ser. No. 165,212, noted hereinbefore. The electrolyte of the cell is a 75% by weight aqueous potassium hydroxide solution. The operating temperature is 200° C. The anode is fed with a 1–1 molar gaseous mixture of methanol and water at a pressure of 5 p.s.i.g. Oxygen, at a pressure of 10 p.s.i.g. is fed to the cathode. Current density vs. cell potential data are as follows:

| Current density (ma./cm.$^2$) | Cell potential (volts) |
|---|---|
| 0 | 1.062 |
| 5 | 1.010 |
| 10 | 0.973 |
| 25 | 0.916 |
| 33 | 0.896 |

*Example 2*

A biporous nickel cathode is activated by impregnating the nickel structure with a solution of cobalt and nickel nitrates at a 7 to 3 ratio of cobalt to nickel containing 10% by weight metals. After drying, the structure is oxidized at 500° C. in air. An anode is prepared by activating a non-porous 75% palladium-25% silver alloy membrane with palladium-black, as described in Example 1. After the non-porous membrane is activated with palladium-black, powdered Girdler G–66, having a particle size of −230 mesh on the Tyler scale, which is a shift catalyst containing 66.6% zinc, 9.6% copper, 5.7% chromium and traces of iron, marketed by Girdler Catalyst, Chemical Products Division, Chemetron Corp., is packed behind the non-porous membrane. The electrodes were placed in holders and immersed in a 75% by weight potassium hydroxide electrolyte at a temperature of 200° C. Oxygen was supplied to the cathode at a pressure of 10 p.s.i.g. and a mixture of ethanol and water vapor at a 1 to 3 mole ratio was fed to the anode at a pressure of 10 p.s.i.g. The distance between the electrodes is ⅝ of an inch. Current density vs. cell potential data are as follows:

| Current density (ma./cm.$^2$) | Cell potential (volts) |
|---|---|
| 0 | 1.010 |
| 50 | 0.840 |
| 100 | 0.800 |
| 150 | 0.762 |

*Example 3*

A fuel cell is constructed as disclosed in Example 2 above, however, the distance between the electrodes is ¾ of an inch. Air is supplied to the cathode at a pressure of 10 p.s.i.g. and a mixture of methanol and water vapor at a 1–1 molar ratio is fed to the anode at a pressure of 10 p.s.i.g. Current density vs. cell potential data are as follows:

| Current density (ma./cm.$^2$) | Cell potential (volts) |
|---|---|
| 0 | 1.130 |
| 50 | 1.025 |
| 100 | 0.915 |
| 150 | 0.800 |

*Example 4*

An anode is prepared by grinding Girdler G–66 carbon monoxide shift catalyst, described hereinbefore, to a −230 mesh particle size on the Tyler scale, and backing the gas side of a palladium-black activated 1.5 mil thick 75%

Pd-25% Ag alloy hydrogen diffusion membrane with the powder. The activation of the membrane followed the procedure of Example 1 above. The thickness of the backing catalytic layer is 1/32 of an inch.

The electrode is placed in a holder and the assembly immersed in 75% by weight aqueous KOH electrolyte, maintained at a temperature of 200° C. The feed consisted of a mixture of CO and $H_2O$ vapor at a 2 to 3 volume ratio at 3 p.s.i.g. pressure. Current-voltage characteristics of the cell are as follows:

| Current Density ($ma./cm.^2$) (measured) | Anode Polarization Volt (measured) | Fuel Cell Volts* (no IR loss) (calculated) |
|---|---|---|
| 0 | 0 | 1.120 |
| 50 | 0.024 | 1.036 |
| 100 | 0.047 | 0.963 |
| 150 | 0.057 | 0.893 |

*Values calculated assuming the use of a cobalt-nickel oxide activated biporous nickel cathode operating under 10 p.s.i.g. air pressure.

*Example 5*

An anode was prepared by activating a non-porous, 75% palladium-25% silver alloy membrane 1.5 mils thick with palladium-black as described in Example 1. After activation of the non-porous membrane, a reforming catalyst composed of 58% nickel on a kieselguhr support, with the ratio of reduced nickel to total nickel being 0.60–0.65, said nickel being pre-reduced and stabilized, and having a particle size sufficiently small to pass through a 10 mesh sieve on the Tyler scale was packed behind the anode. A biporous nickel cathode, activated with cobalt-nickel oxide as described in Example 1, and the anode were placed in holders and immersed in an 85% by weight potassium hydroxide solution maintained at 255° C. Oxygen was supplied to the cathode at a pressure of 10 p.s.i.g. A mixture of methane and water vapor was fed to the anode. The ratio of steam to methane in the feed was 2.3 on a molar basis. The methane-steam mixture was fed at a total pressure of one atmosphere. The spacing between the cathode and anode was ½ inch. Current density vs. cell potential data are as follows:

Current density ($ma./cm.^2$):     Cell potential (volts)
0 _____ 1.09
22.5 _____ 1.02
45.5 _____ 1.88
69 _____ 0.625

*Example 6*

A biporous nickel cathode was activated with cobalt-nickel oxide as described in Example 1. The anode was prepared by activating a 75% palladium-25% silver alloy membrane with palladium-black as described in Example 1. Thereafter a reforming catalyst composed of 58% nickel on a kieselguhr support, with the ratio of reduced nickel to total nickel being 0.60–0.65, said nickel being pre-reduced and stabilized, and having a particle size small enough to pass through a 10 mesh sieve on the Tyler scale was packed behind the non-porous membrane. The electrodes were placed in holders and immersed in an 85% by weight potassium hydroxide bath maintained at 250° C. Oxygen was supplied to the catalyst at a pressure of 5.2 p.s.i.g. and a fuel mixture to the anode at 5.5 p.s.i.g. The fuel mixture consisted of normal hexane and water in a weight ratio of 1.15:1. The fuel mixture was vaporized prior to feeding it into the anode chamber. The spacing between the anode and cathode was ½ inch. Current density vs. cell potential data are as follows:

Current density ($ma./cm.^2$):     Cell potential (volts)
0 _____ 1.030
34.5 _____ 0.895
50 _____ 0.826
80.5 _____ 0.722
100 _____ 0.683
126 _____ 0.650

*Example 7*

A biporous nickel cathode was activated with cobalt-nickel oxide as described in Example 1. The anode was prepared by activating a 75% palladium-25% silver alloy membrane with palladium-black as described in Example 1. Therafter a reforming catalyst composed of 58% nickel on a kieselguhr support, with the ratio of reduced nickel to total nickel being 0.60–0.65, said nickel being pre-reduced and stabilized, and having a particle size small enough to pass through a 10 mesh sieve on the Tyler scale was packed behind the non-porous membrane. The electrodes were placed in holders and then immersed into an 85% by weight potassium hydroxide bath kept at a temperature of 250° C. Oxygen was fed to the cathode at a pressure of 8 p.s.i.g. and a fuel mixture fed to the anode at atmospheric pressure. The fuel mixture consisted of unleaded high test Amoco gasoline and water in the volumetric ratio of 0.538:1 (the unleaded gasoline had the following specifications: Octane number=100.8; sulfur content=0.0004%; distillation=10% at 120° F., k 50% at 240° F., 90% at 330° F., and distillation residue of less than 1%). The liquid fuel mixture was vaporized and fed to the cathode. The spacing between the anode and cathode was ½ inch. Current density vs. cell potential data are as follows:

Current density ($ma./cm.^2$):     Cell potential (volts)
0 _____ 1.07
20 _____ 1.03
40 _____ 0.98
60 _____ 0.905
80 _____ 0.805
100 _____ 0.700

*Example 8*

A biporous nickel cathode was activated with a nickel-cobalt oxide as described in Example 1. A 75% palladium-25% silver alloy membrane 1.5 mils thick was activated with palladium-black as described in Example 1. Thereafter, a reforming catalyst in pellet form (3/16 x 1/8 inch) was packed behind the palladium-black activated palladium-silver alloy hydrogen diffusion membrane. The catalyst was composed of pre-reduced nickel stabilized so as to be non-pyrophoric on exposure to air, containing 50% nickel supported on kieselguhr. The electrodes were placed in holders and then immersed in an aqueous 85% by weight KOH bath kept at 250° C. Oxygen or air was supplied to the cathode at a pressure of 8.5 p.s.i.g. A fuel mixture consisting of normal heptane vaporized and bubbled through water boiling at 240° F. under pressure was fed to the anode chamber. The pressure of the fuel mixture was reduced to 3.5 p.s.i.g. prior to entering the anode chamber. The spacing between the anode and cathode was ½ inch. Current density vs. cell potential data on cells operating on oxygen and air, respectively, are as follows:

| Current Density ($ma./cm.$) | Cell Potential (volts) | |
|---|---|---|
| | Oxygen | Air |
| 0 | 1.09 | 1.09 |
| 20 | 1.04 | 1.015 |
| 40 | 0.985 | 0.90 |
| 60 | 0.865 | 0.74 |

In Examples 1–8, the non-porous palladium alloy membrane is composed of 75% palladium and 25% silver on a weight basis. However, the alloy can be replaced by other hydrogen diffusion palladium alloys, preferably containing from about 5–40% by weight silver or gold.

In Examples 1–8, the palladium black used to activate the membranes can be replaced by other blacks including rhodium black, ruthenium black, palladium-rhodium black, platinum-rhodium black and palladium-iridium black.

The catalysts in Examples 1–8 can be replaced by other reform and/or shift catalysts containing nickel, zinc, thorium, cobalt, copper, iron, their oxides, and mixtures thereof.

In Examples 1–8, the fuel can be replaced by other hydrogen producing fuels including ethane, propane, butane, pentane and ammonia.

As is apparent from the data in the above examples, the fuel cell unit containing an in situ hydrogen generator provides excellent electrochemical performance. The cell, when operated on a low cost, relatively inactive hydrogen generating fuel, is comparable in every way to a fuel cell employing pure hydrogen. The cell has excellent durability when employing either an alkaline or acid electrolyte. The fuel cell membrane shows no tendency to disintegrate or become inactive after prolonged periods of continuous operation.

While various modifications of the invention are disclosed, it should be appreciated that the invention should not be restricted thereto, but that other embodiments will be apparent to one skilled in the art, which come within the scope and spirit of the invention and the appended claims.

It is claimed:

1. A hydrogen-oxidant fuel cell for the direct generation of electricity containing an in situ hydrogen generator comprising an electrolyte, a three-layer anode unit comprising a non-porous hydrogen diffusion membrane, one major surface of said membrane being in contact with said electrolyte, a layer of metal black in intimate contact with the second major surface of said membrane, said metal black being an element of Group VIII of the Mendelyeev's Periodic Table, and a layer of catalyst in intimate contact with the second major surface of said layer of metal black, said catalyst layer being dissimilar from said metal black layer and capable of analyzing hydrogen from hydrogen containing material, a cathode, means for supplying a carbonaceous fuel and oxidant to said anode unit and cathode respectively, said anode unit analyzing said carbonaceous fuel into hydrogen and by-products at the catalyst layer and consuming said hydrogen at the metal black layer and hydrogen diffusion membrane.

2. The fuel cell of claim 1 wherein the non-porous hydrogen diffusion membrane is a palladium alloy.

3. The fuel cell of claim 1 wherein the activating metal black is palladium black.

4. The fuel cell of claim 1 wherein the catalytic layer comprises a mixture containing 66.6 percent zinc, 9.6 percent copper, and 9.7 percent chromium.

5. A method of generating electricity directly from a fuel and oxidant in a fuel cell comprising a cathode, a three-layer anode unit, and electrolyte comprising the steps of feeding a hydrogen containing material into said three-layer anode unit comprising a non-porous membrane in intimate contact at one major surface with a metal black layer, and at the second major surface with the electrolyte of the cell, said metal black layer being an element of Group VIII of the Mendelyeev's Periodic Table and being in intimate contact at its second major surface with a catalytic layer which is dissimilar from said metal black layer, whereby hydrogen is formed at said catalytic layer and consumed at the metal black layer and hydrogen diffusion membrane as it is formed thereby unbalancing the equilibrium of the hydrogen forming reaction, said method being carried out at a temperature of about 25° C. and not over 400° C.

6. The method of claim 5 wherein the temperature of the method is from about 75 to 225° C.

7. The method of claim 5 wherein the non-porous hydrogen diffusion electrode is a palladium alloy.

8. The method of claim 7 wherein the catalytic layer comprises a mixture containing 66.6 percent zinc, 9.6 percent copper, and 5.7 percent chromium.

References Cited

UNITED STATES PATENTS

| | | | |
|---|---|---|---|
| 3,177,097 | 4/1965 | Beals | 136—86 |
| 3,180,762 | 4/1965 | Oswin | 136—86 |
| 3,259,523 | 7/1966 | Faris et al. | 136—86 |

WINSTON A. DOUGLAS, *Primary Examiner.*

H. FEELEY, *Assistant Examiner.*